United States Patent [19]

Stanley

[11] Patent Number: 5,266,859
[45] Date of Patent: Nov. 30, 1993

[54] SKEWING OF POLE LAMINATIONS OF A SWITCHED RELUCTANCE MACHINE TO REDUCE ACOUSTIC NOISE

[75] Inventor: Marlin L. Stanley, Amsterdam, N.Y.

[73] Assignee: General Electric Company, Schenectady, N.Y.

[21] Appl. No.: 43,700

[22] Filed: Apr. 8, 1993

Related U.S. Application Data

[63] Continuation of Ser. No. 773,822, Oct. 9, 1991, abandoned.

[51] Int. Cl.⁵ .............................................. H02K 1/06
[52] U.S. Cl. .................................. 310/216; 310/217; 310/51; 310/258; 310/261
[58] Field of Search .................. 310/216, 217, 51, 258, 310/259, 261

[56] References Cited

U.S. PATENT DOCUMENTS

| | | | |
|---|---|---|---|
| 1,835,505 | 12/1931 | Liner | 310/163 |
| 4,260,926 | 4/1981 | Jarret et al. | 310/254 |
| 4,684,867 | 8/1987 | Miller et al. | 318/701 |

FOREIGN PATENT DOCUMENTS

| | | |
|---|---|---|
| 57-180339 | 11/1982 | Japan . |
| 215433 | 5/1924 | United Kingdom . |
| 2167910 | 6/1986 | United Kingdom . |

Primary Examiner—Steven L. Stephan
Assistant Examiner—Judson H. Jones
Attorney, Agent, or Firm—Jill M. Breedlove; Marvin Snyder

[57] ABSTRACT

The laminations respectively comprising the rotor and stator poles of a switched reluctance machine (SRM) are skewed as they are stacked during machine assembly in order to reduce the tendency of the SRM to flatten and thereby assume an oval shape during machine operation. As a result, the acoustic noise generated by the SRM during machine operation is substantially reduced.

1 Claim, 2 Drawing Sheets

SKEWING OF POLE LAMINATIONS OF A SWITCHED RELUCTANCE MACHINE TO REDUCE ACOUSTIC NOISE

This application is a continuation of U.S. patent application Ser. No. 07/773,822, filed Oct. 9, 1991 now abandoned.

FIELD OF THE INVENTION

The present invention relates generally to switched reluctance machines and, more particularly, to the skewing of rotor and stator laminations in order to reduce acoustic noise generated by the machine.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and the stator poles that are approaching each other. The current is switched off in each phase before the rotor poles nearest the stator poles of that phase rotate past the aligned position; otherwise, the magnetic force of attraction would produce a negative, or braking, torque. In a SRM, torque direction is independent of current direction. Therefore, in contrast to most other brushless machines which require bidirectional phase currents, a SRM power inverter can be configured to enable current flow in only one direction through a phase winding. Such an inverter generally employs one or more switching devices, such as transistors or thyristors, in series with each machine phase winding. Exemplary SRM converters are illustrated in commonly assigned U.S. Pat. No. 4,684,867, issued to T. J. E. Miller on Aug. 4, 1987, which is hereby incorporated by reference.

A SRM operates by switching the machine phase currents on and off in synchronism with rotor position. That is, by properly positioning the firing pulses relative to rotor angle, forward or reverse operation and motoring or generating operation can be obtained. Usually, the desired phase current commutation is achieved by feeding back the rotor position signal to a controller from a shaft angle transducer, e.g., an encoder or a resolver.

Despite its advantages as a simple and efficient machine useful in adjustable speed drives, a SRM is typically noisy. In large part, this is due to the "ovaling" of the stator during machine operation. "Ovaling" refers to the tendency of the stator to flatten and thereby assume an oval shape during machine operation, resulting from the electromagnetic attraction between the rotor poles of the machine and the diametrically-opposed stator poles of each energized phase. Therefore, an object of the present invention is to reduce the "ovaling" effect of an SRM stator as it rotates, thereby reducing the acoustic noise generated during SRM operation.

SUMMARY OF THE INVENTION

The laminations respectively comprising the rotor and stator poles of a SRM are skewed in the same direction as they are stacked during machine assembly. As a result, the electromagnetic force of attraction between the rotor poles and the stator poles of each energized phase is spread out, thereby reducing the tendency of the SRM to assume an oval shape during machine operation. In this way, the acoustic noise generated by the SRM during machine operation is substantially reduced.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
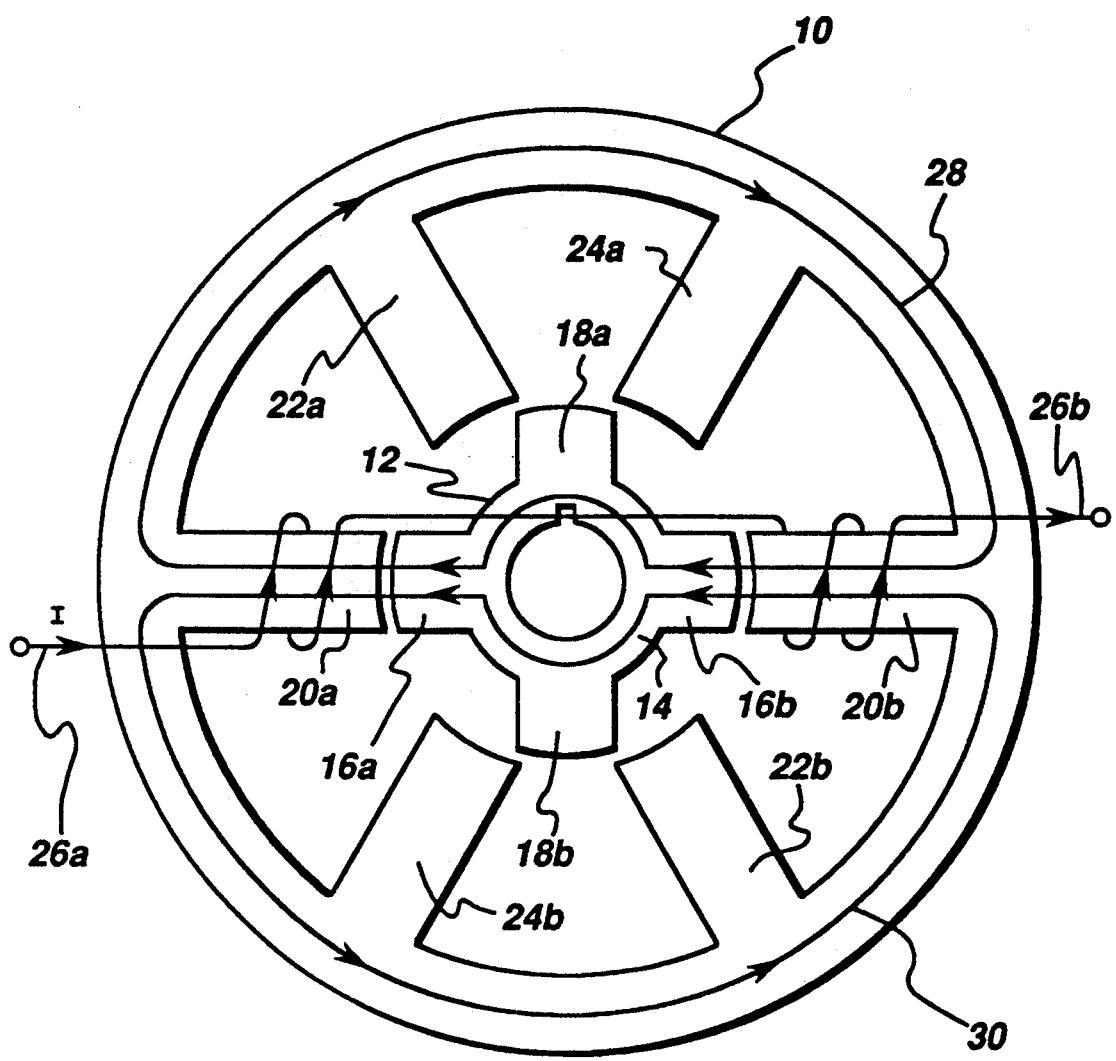
FIG. 1 is a cross sectional view of a typical SRM rotor and stator configuration.

FIG. 1 is a cross sectional view of a stator 10 and a rotor 12 of a typical switched reluctance machine (SRM) 14. Rotor 12 of SRM 14 is rotatable in either a forward or reverse direction within stationary stator 10. Rotor 12 has two pairs of diametrically opposite rotor poles 16a-16b and 18a-18b. Stator 10 has three pairs of diametrically opposite stator poles 20a-20b, 22a-22b, and 24a-24b. For purposes of illustration, stator pole coil windings 26a and 26b are shown as being wound only about stator poles 20a and 20b, respectively; however, it is to be understood that stator pole coil windings would generally be wound about each pair of opposing stator poles. The stator pole coil windings on each pair of opposing or companion stator pole pairs are connected in series or parallel to form a motor phase winding. As shown in FIG. 1, the current I in each phase produces a magnetic flux linkage by generating flux in the directions indicated by arrows 28 and 30. For example, as shown, windings 26a and 26b are connected in series so that the current I flows in the direction indicated. During SRM operation, the electromagnetic force of attraction between the rotor poles and the stator poles of each energized phase causes the stator "ovaling" phenomena described hereinabove, resulting in noisy SRM operation.

Figure 2:
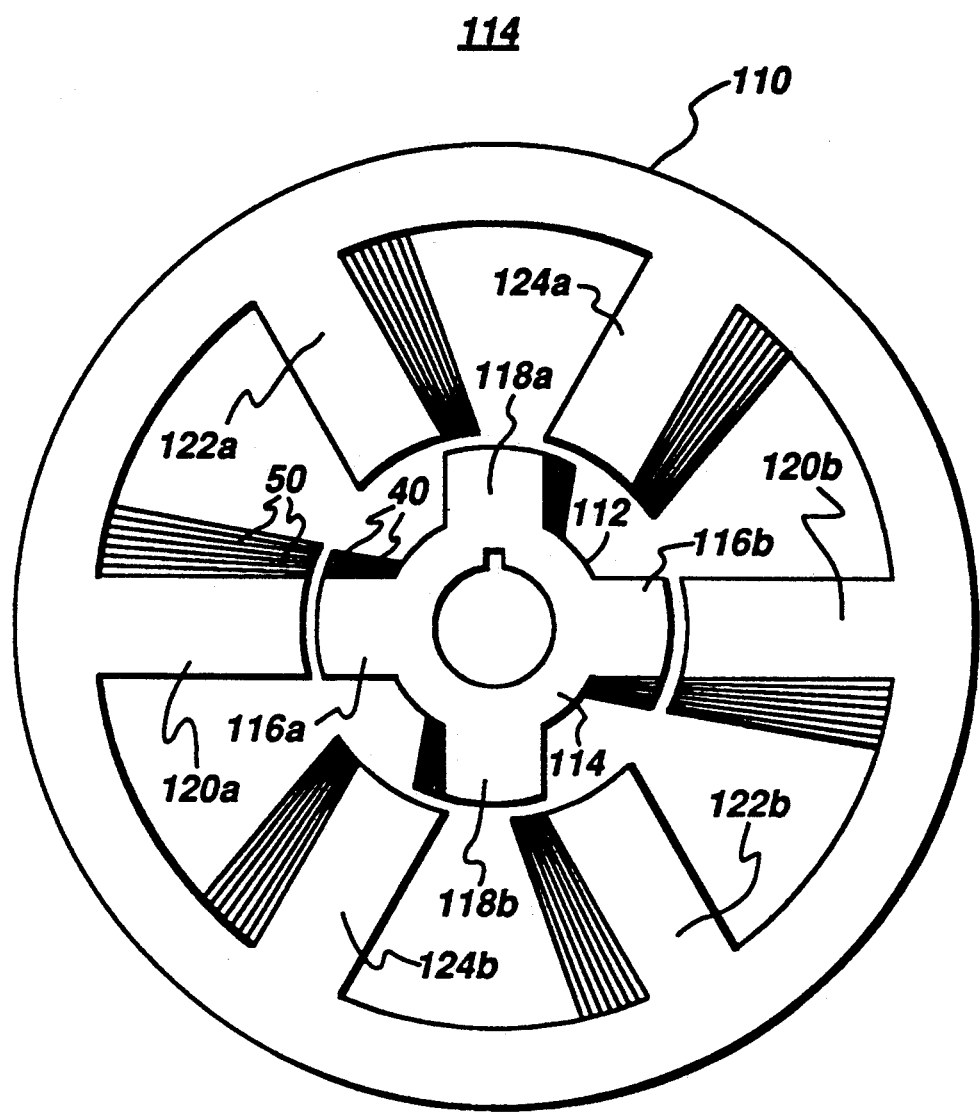
FIG. 2 is a cross sectional view of a rotor and stator of a SRM, the rotor and stator each having skewed laminations in accordance with the present invention.

FIG. 2 illustrates a SRM 114 according to the present invention having skewed rotor laminations 40 comprising rotor poles 116a, 116b, 118a and 118b, and further having skewed stator laminations 50 comprising stator poles 120a, 120b, 122a, 122b, 124a and 124b. As shown in FIG. 2, the rotor and stator laminations are skewed in the same direction. In particular, the laminations of each stator pole and e pole are arranged in a fan-like manner so as to spread out each respective pole. As a result, the electromagnetic forces of attraction between the rotor poles and the stator poles of each energized phase are spread over a larger pole area, thereby avoiding the tendency of the stator to flatten per the "ovaling" phenomena. Moreover, the skewing of the rotor and stator laminations further provides mechanical reinforcement of the rotor-stator configuration, also tending to avoid "ovaling". By thus avoiding "ovaling", acoustic noise generated by the SRM is substantially reduced.

In an alternative embodiment, only the stator pole laminations are skewed to reduce acoustic noise.

Although SRM 114 is shown in FIG. 2 as having three-phases with six stator poles and four rotor poles, it is to be understood that the principles of the present invention apply to a SRM having any number of phases and also to any suitable combination of stator and rotor poles.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A switched reluctance machine, comprising:
   a stator having at least one pair of opposing stator poles, each of said stator poles comprising a plurality of stator laminations, said stator laminations of each of said stator poles being skewed in a fan-like manner in order to minimize acoustic noise generated during operation of said switched reluctance machine due to ovalization of said stator.
   a stator pole winding wound about each of said stator poles, the stator pole windings of each pair of opposing stator poles being electrically connected together; and
   a rotor positioned for rotation within said stator, said rotor having at least one pair of opposing rotor poles, each of said rotor poles comprising a plurality of rotor laminations, said rotor laminations of each of said rotor poles being skewed in a fan-like manner in the same direction as said stator laminations are skewed in order to further reduce acoustic noise due to ovalization of said stator.

* * * * *